United States Patent
Preston et al.

(10) Patent No.: US 7,197,739 B2
(45) Date of Patent: Mar. 27, 2007

(54) APPARATUS FOR AUTOMATICALLY GENERATING SOURCE CODE

(75) Inventors: Keith R Preston, Woodbridge (GB); Caroline A Leathem, Ipswich (GB)

(73) Assignee: British Telecommunications public limited company, London (GB)

( * ) Notice: Subject to any disclaimer, the term of this patent is extended or adjusted under 35 U.S.C. 154(b) by 874 days.

(21) Appl. No.: 10/169,352

(22) PCT Filed: Jan. 30, 2001

(86) PCT No.: PCT/GB01/00375

§ 371 (c)(1),
(2), (4) Date: Jul. 1, 2002

(87) PCT Pub. No.: WO01/57653

PCT Pub. Date: Aug. 9, 2001

(65) Prior Publication Data

US 2003/0046061 A1 Mar. 6, 2003

(30) Foreign Application Priority Data

Jan. 31, 2000 (EP) .................................. 00300742

(51) Int. Cl.
*G06F 9/44* (2006.01)
(52) U.S. Cl. .................................................... 717/106
(58) Field of Classification Search ................ 717/104, 717/109, 113, 136, 139, 143, 144; 706/23, 706/47
See application file for complete search history.

(56) References Cited

U.S. PATENT DOCUMENTS 5,167,009 A * 11/1992 Skeirik ........................ 706/23
5,499,371 A * 3/1996 Henninger et al. ......... 717/108
5,555,367 A * 9/1996 Premerlani et al. ............ 707/4

(Continued)

FOREIGN PATENT DOCUMENTS

EP      0442240 A2      8/1991

(Continued)

OTHER PUBLICATIONS

Michael G. Main et al., Denotational Semantics for "Natural" Language Question-Answering Program, Jan. 1983 Computational Linguistics, MIT Pressvol. 9, Issue1, pp. 11-21.*
Sergei Nirenburg, "Machine translation of natural languages", Apr. 1985, ACM Press, Issue 92, pp. 128-144.*

(Continued)

*Primary Examiner*—Wei Zhen
*Assistant Examiner*—Anna Deng
(74) *Attorney, Agent, or Firm*—Nixon & Vanderhye P.C.

(57) ABSTRACT

Software is automatically generated from one or more predefined functions in accordance with an input statement entered in natural language. Semantically meaningful elements are extracted from the input statement and one or more sets of second semantically meaningful elements are extracted from the predefined functions. At least one of a condition, an action and/or a statement is identified in the input statement. The first semantically meaningful elements are compared with the second semantically meaningful elements to identify predefined functions that correspond to action(s) and/or statement(s) of the input statement. At least some of the first semantic elements are combined in accordance with identified conditions to generate corresponding condition variables. Identified functions and condition variables are combined according to a set of predetermined rules to generate software.

15 Claims, 13 Drawing Sheets

U.S. PATENT DOCUMENTS 5,634,024 A * 5/1997 Yamaguchi .................. 712/200
6,016,467 A * 1/2000 Newsted et al. ................ 704/9
6,493,694 B1 * 12/2002 Xu et al. ....................... 706/47

FOREIGN PATENT DOCUMENTS

WO     WO 97/40425     10/1997

OTHER PUBLICATIONS

Seki et al, "A Method for Translating Natural Language Program Specifications into Algebraic Specifications", Systems & Computers in Japan, US, Scripta Technica Journals, New York, vol. 23, No. 11, Jan. 1, 1992, pp. 1-16, SP000380833.

* cited by examiner

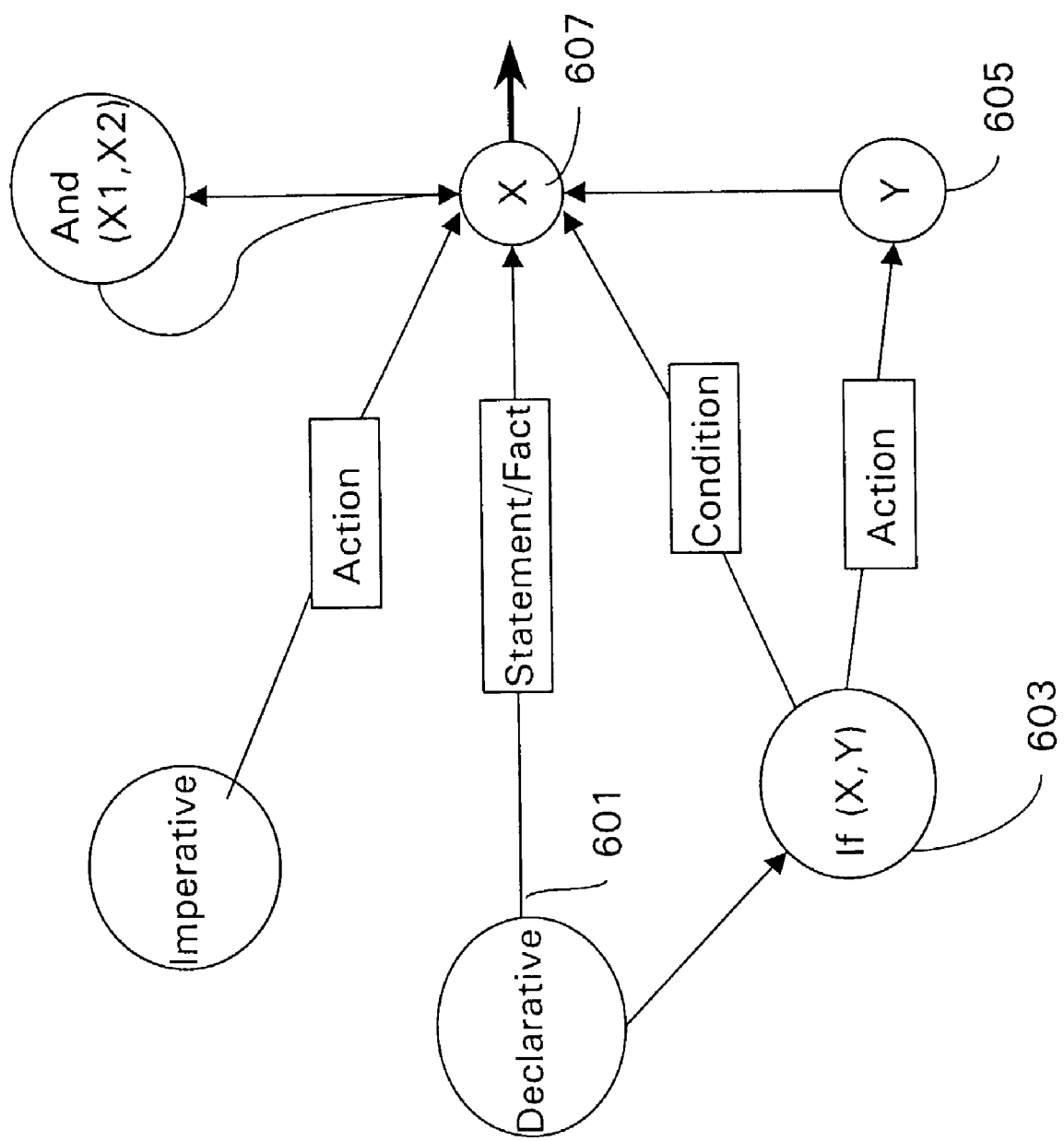

APPARATUS FOR AUTOMATICALLY GENERATING SOURCE CODE

This application is the US national phase of international application PCT/GB01/00375 filed 30 Jan. 2001 which designated the U.S.

BACKGROUND

1. Technical Field

The present invention relates to apparatus for automatically generating source code, and is particularly, but not exclusively, suitable for generating source code for communication services.

2. Related Art

Traditionally, software development has comprised several identifiable processes: requirements capture, where customer requirements are broken down into fundamental descriptions that can be used to create specifications; design of software elements to these specifications; implementation of the software elements to create a software deliverable; and maintenance of the software deliverable. In many cases, the customer requirements further include developing hardware, which will be integrated with the software deliverable. All of these processes are time consuming and costly in their preparation, and often there are integration and implementation problems. In order to correct these problems, some re-design may be required, which often delays the down-streaming of the deliverables and adds significantly to the costs.

Several groups have focussed on identifying areas in the development process that could be pruned to offer time and cost savings, noting in particular that around sixty to seventy percent of a system's functionality duplicates that of other systems. There is thus significant interest in developing tools that generate software automatically, as this offers reductions in software design stage costs. AT&T have disclosed, in "Object Magazine 5, 1995", a tool that can generate object-oriented code from graphical models. However, ideally automatic code generators should be adaptable to different platforms, different standards, and different languages, and not be restricted to generating object oriented code.

Automating the validation of code could also offer significant cost savings, as identified by the British Aerospace Dependable Computer System Centre in York, in "Qualification of automatic code generation using formal techniques"[1]. The paper presents an animation facility to validate the code, which embeds formal methods to perform the validation itself.

[1] for the IEE colloquium on "practical application of formal methods"

There are several quasi-automatic code generators, such as the "wizards" developed by the Microsoft™ Corporation; these create basic class template syntax, leaving the programmer to insert the code that is specific to the application under development. However, these are language specific, are limited to producing code templates, and require the user have a working knowledge of the language itself. Another quasi-automatic method of code generation includes "forms", where a user fills in fields comprising the form. However, the entries must adhere to a specific format, and the functionality of the code that is generated is extremely limited.

Methods of using graphical methods to generate code are also well known. For example, the JBuilder™ product from Borland incorporates a GUI designer by which the software developer can use a visual tool to draw the required user interface elements. The system then produces appropriate Java source code to handle these elements automatically, and allows the developer to merge this with conventionally-written code. Other systems such as Rational Rose™ and Oracle Designer™ allow the developer to express the program logic using graphical symbols, and then generate code automatically. In all of these cases the user must have a knowledge of the graphical notation used, which may be Unified Markup Language (UML) or some other convention. In addition, the user must have a good understanding of the programming language used in order that he or she can fill in certain parts of the template code produced, and also interface the automatically generated code with other parts of the software application. This restricts the usefulness of this type of system to experienced software programmers.

There are many situations where it is desirable for a non-programmer to be able to program a system so that it can subsequently act on his or her behalf without further interaction. A telephone answering machine is a simple example of such a system; the user implicitly instructs the device to answer the telephone call and to record a message in his or her absence. Another well-known example is the video recorder, which may be set to record a programme when the user is out or fast asleep. However, it is well know that many people have difficulty even with the relatively simple task of programming a video recorder. In addition, even experienced programmers make errors, particularly when dealing with complex logic, and the process of testing that the program behaves as required (debugging) is a well established part of the software development process.

As e-commerce continues to develop, examples of systems to which a user delegates some of his or her authority, will become more widespread. A recent example is that of a proxy, used in on-line auctions. The user can instruct his or her proxy to bid up to a certain amount for a particular item. Future systems may allow much more complex negotiations to be carried out in real time, following the instructions laid down previously by the human user. If these systems are to be used and trusted, it is essential that users without programming experience can program them effectively and have confidence that the system will subsequently exhibit the appropriate behaviour. Preferably this should not require the user to learn a programming language or a particular graphical notation.

BRIEF SUMMARY

According to one aspect of the present invention there is provided a method of automatically generating software from one or more predefined functions in accordance with an input statement entered in natural language, the method comprising the steps of:

(i) analysing the input statement for its semantic content, so as to extract first semantically meaningful elements from the input statement;

(ii) analysing the one or more predefined functions for their semantic content, so as to extract one or more sets of second semantically meaningful elements from the one or more predefined functions;

(iii) identifying at least one of a condition, an action and/or a statement in the input statement;

(iv) comparing the first semantically meaningful elements with the second semantically meaningful elements so as to identify one or more predefined functions that correspond to one or more action and/or statement of the input statement;

(v) combining at least some of the first semantic elements in accordance with any conditions identified at step (iii) so as to generate corresponding condition variables;
(vi) combining functions and condition variables identified at steps (iv) and (v) according to a set of predetermined rules in order to generate the software.

BRIEF DESCRIPTION OF THE DRAWINGS

Embodiments of the invention will now be illustrated, by way of example only, with reference to the accompanying drawings, in which:

FIG. 6a is a schematic diagram showing categorisation of phrases;

DETAILED DESCRIPTION OF EXEMPLARY EMBODIMENTS

Figure 1A:
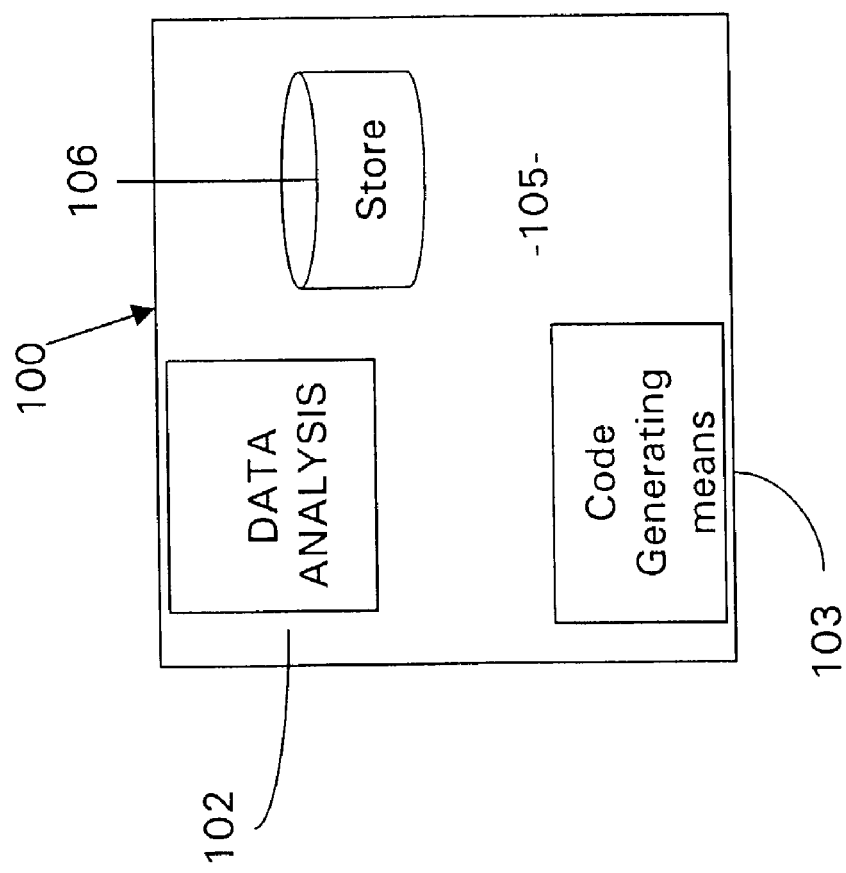
FIG. 1a is a schematic diagram showing apparatus for automatically generating source code according to an embodiment of the present invention.

Various phrases are used in the following description, and in the context of the present invention these are defined as follows:

"Semantically meaningful elements" are elements found in natural language and may be defined with reference to the following example: "The cat sat on a mat":

a) meaningful semantic entities, typically denoted by nouns. For example the semantic entities are "cat", "and "mat".
b) the form of each of the entities (e.g. whether it is singular or plural), and whether it is in the definite or indefinite form. In the example, "the cat" is singular, and "the" indicates that it is the definite article. "Mat" is singular, and "a" indicates that it is in the indefinite form.
c) "States of affairs"—generally indicated by verbs. States of affairs indicate either actions, as most verbs do, or states of being (e.g. the verb "to be"). In this example, "sat" is a state of affairs.
d) The conditions attached to each state of affairs (e.g. the tense of the verb concerned)
e) Modifiers (e.g. adverbs or adjectives) which ascribe properties or otherwise modify an entity or state of affairs.
f) The linkages between the occurrences of the foregoing (e.g. which entities a state of affairs affects and how; and which entities or state of affairs a modifier modifies).

"semantic content": a collection of semantically meaningful elements (as defined above) comprising a phrase;

"semantic pattern": semantic identifiers that represent a relationship between semantically meaningful elements;

"logical structure": logical flow of information, in the form of Boolean operators (and, or, if, then) and conditions and actions that are dependent on the operators;

"input statement": phrase or sentence entered by a user for analysis of its semantic content;

"function": a named part of a computer program that can be invoked from other parts of a program as needed;

"function definition": the name of a function, the type of the value it returns (if any), and the types and names of its arguments (if any) and the code comprising the function. The form of a function definition is language-specific, in terms of variable types, variable declaration, and code syntax;

"function description": natural language phrase or sentence describing the functional capability of a function.

Further, in the following description, a "user" is not necessarily limited to a human entity, as it might well be for instance another piece of equipment or a software agent.

Overview

Broadly, in a telecommunications environment for instance, using an embodiment of the present invention, a user can input a natural language instruction (an "input statement") and it will be analysed and used to put together source code customised for carrying out the user's wishes in that environment. For instance, the user might make the input statement "Please divert my phone to Frank's". That statement will be analysed and used to generate source code that causes call divert on incoming calls for that user to the telephone number of the named person. The source code so generated will need to be appropriate to the current telecommunications environment for the user, for instance in terms of operating systems, database query languages and transmission protocols, but the user needs no technical knowledge of that environment. Further, embodiments of the present invention can be transferred to a different technical environment for the same user relatively easily.

With reference to FIG. 1 of the accompanying drawings, apparatus 100 for analysing input statements and automatically generating customised source code according to the present invention may generally be referred to as a 'software generator' 100. The generator 100 is shown divided into the following functional parts:
DATA ANALYSER 102
CODE GENERATOR 103
COMPUTER 105
DATA STORAGE 106

Figure 1B:
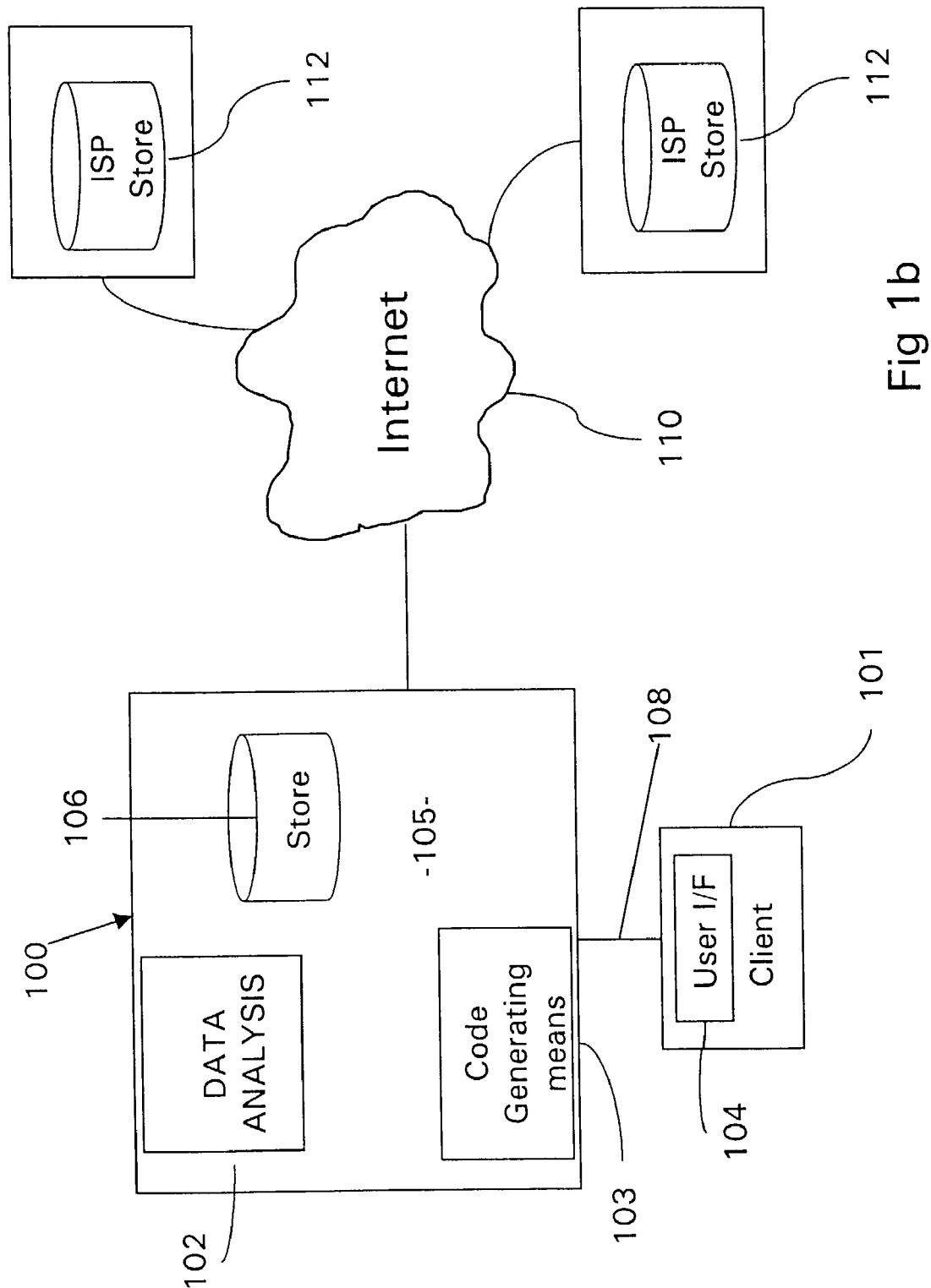
FIG. 1b is a schematic diagram showing apparatus for automatically generating source code according to a further embodiment of the present invention.

The COMPUTER 105 can either be a standalone machine, as shown in FIG. 1a, or a server computer that receives input from a client terminal 101 via a communications network 108, as shown in FIG. 1b. The software generator 100 may be built into a telephone, or a mobile phone using speech recognition and synthesis for input and output respectively.

When the computer is a server, as shown in FIG. 1b, the computer 105 may be additionally connected to external data stores 112 via a communications network such as the Internet 110. Information about the Internet can be found, for example, from The World Wide Web Handbook from International Thomson Computer Press, ISBN: 1-850-32205-8. The terms "client" and "server" are illustrative but not limiting to any particular architecture.

The DATA STORAGE 106 functional part of the apparatus is located on the computer 105 and includes one or more data stores comprising predefined functions, referred to as function definitions. These function definitions are used as described later in the generation of the software code, and include the code comprising a function, the name of each function and any arguments it takes and their types. In addition, each predefined function has an associated natural language description, referred to as a function description, from which the data analyser 102 can extract the functional capability of corresponding predefined functions. This process is explained in detail with reference to the embodiment below. The data storage 106 also includes linguistic stores comprising multilingual lexicons and linguistic, semantic and syntactic information. The data analyser 102 accesses the linguistic stores in order to resolve the meanings of input statements and function descriptions.

The DATA ANALYSER 102 functional part of the apparatus is located on the computer 105 and includes analysing means and comparing means. The data analyser 102 is used for analysing and resolving the meaning of function descriptions that are stored in the data storage 106 and of input statements, so as to identify the functional requirements of input statements and relate them to the functional capability of predefined functions. In descriptive terms, the data analyser 102 matches these functional requirements with predefined functions that have been determined to have the functional capability of the functional requirement. In mechanistic terms, the data analyser 102 determines the semantic content of the input statement and compares the input statement semantic content with the semantic content of a plurality of function descriptions (which have been similarly analysed for their semantic content). If there is a match between the semantics of the input statement and one of the function definitions then that function is considered to meet the functional requirement of the input statement.

The CODE GENERATOR 103 functional part of the apparatus is located on the computer 105 and is used for generating source code from whichever predefined functions have been identified by the data analyser 102.

Brief Overview of Operation:

A user enters an input statement, which comprises any natural language input such as a statement, conditions and actions, and which describes a desired functionality of code to be generated by the generator 100, to the client terminal 101. The user may also specify, using a standard file management browser (e.g. Windows Explorer™), a class or folder in which function descriptions, which relate to the input statement functionality, are located. The input statement is passed to the data analyser 102 for semantic analysis in order to extract the functional requirement of the input statement. The data analyser 102 then retrieves whichever function descriptions are stored at the specified location from the data storage 106 and analyses the function descriptions for their semantic content in order to determine the functional capability of the corresponding functions. The data analyser 102 checks, as is described in detail below, by comparing the semantics of the input statement against the semantics of the function descriptions, that there is a function that meets the functional requirement of the input statement. Assuming that there is a suitable function, the data analyser 102 retrieves the corresponding code comprising the function from the data storage 106. The semantic analysis performed on the input statement by the data analyser 102 also identifies conjunctions from the input statement, and these, together with the retrieved code are passed to the code generator 103. The code generator 103 translates the conjunctions into logical operators, and inserts said operators, together with the retrieved code into a predetermined template, according to a set of predetermined rules, thereby creating a processable computer program. Having assembled these components to form the program, the code generator 103 loads the program onto a terminal, which could be a network device such as a router, a telephone, a server computer or a client computer, for subsequent processing.

The present invention thus:
  can make use of existing functions and/or methods;
  can use functions in any language and generate code in any language;
  does not require the user to be computer code literate;
  allows the user to enter requirements using natural language—input is not required in a standard format;
  enables validation of the software generated via input statements in the form of questions.

First Embodiment of the Invention: Resolution of Input Statements into Source Code An embodiment of the present invention is operable to automatically resolve input statements into source code, provided the software generator 100 has access to source code that it can identify as providing the functional requirements of the input statements. In particular, the present embodiment concerns generation of software to handle telephone calls. The software to be generated will implement requested behaviour by running a number of predefined functions which carry out the lower-level actions of ringing a telephone, forwarding a call etc.

In practice, it will be understood that the generated software could either comprise the actual code providing a set of functions to implement requested behaviour, or it could comprise a set of calls on code which is actually located elsewhere in a network. In the latter case, the generated software thus triggers calls to this code.

The embodiment is described below in more detail, in the following order: firstly analysis of one or more predefined functions, secondly analysis of an input statement, and thirdly subsequent combining of these analyses.

Analysis of One or More Predefined Functions

Function Descriptions

Figure 2:
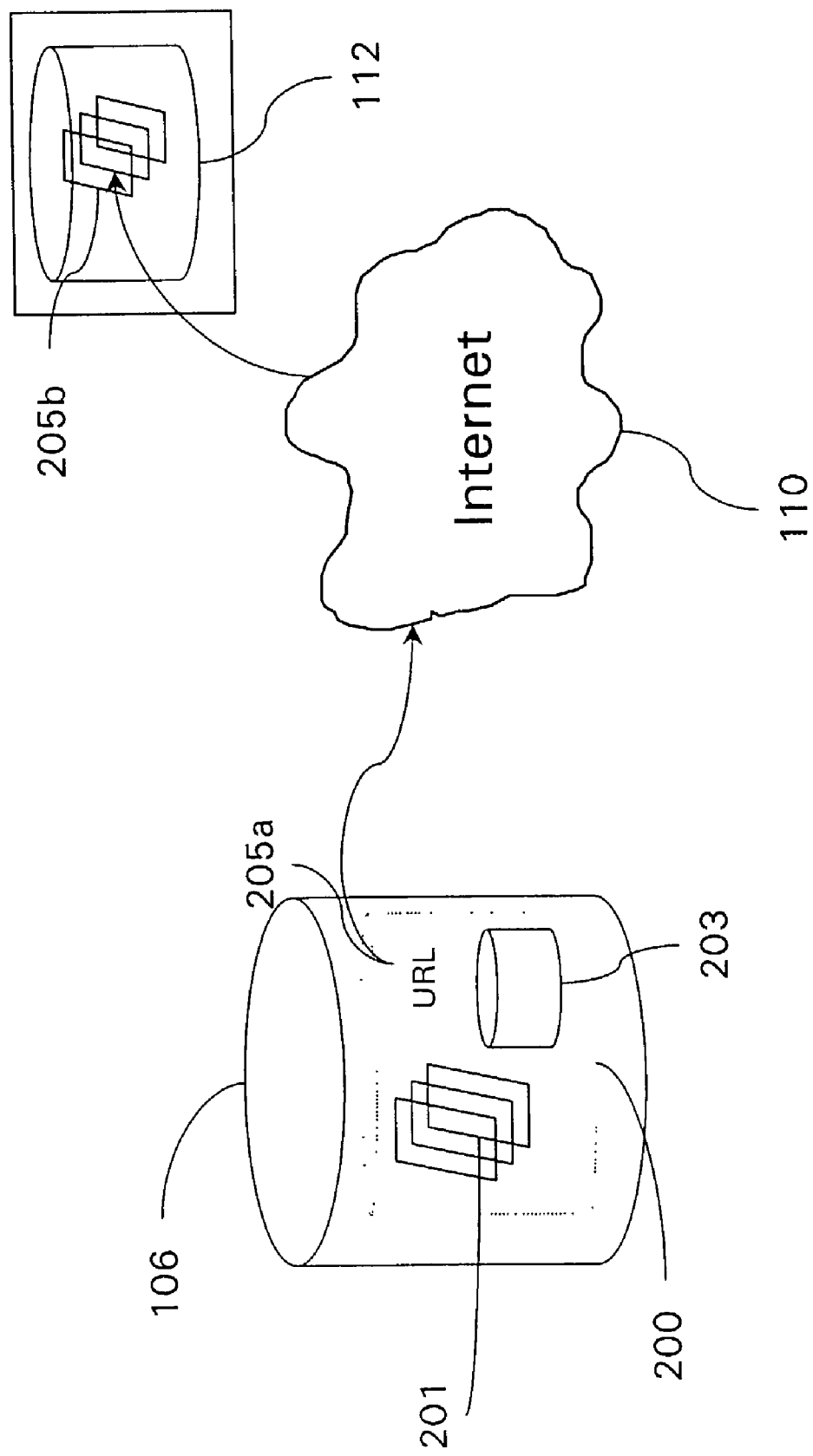
FIG. 2 is a schematic diagram showing data storage providing part of the apparatus of the embodiments of either FIG. 1a or FIG. 1b.

Referring to FIG. 2, information about the functions that are accessible to the generator 100 is stored in data storage 106, specifically in a code database 200, which comprises predefined function definitions. As described briefly above, the predefined functions are accompanied by function descriptions, which, in essence, describe the functional capability of the predefined function. The function descriptions may be given by a separate description that accompanies the functions. In accordance with the conventions used in Java, it will be understood that a method is used to denote a function, and the terms method and function may be used interchangeably when describing the present embodiment. The function description will normally be written by a software developer who has an understanding of the operation of the classes, objects and methods. Descriptions may follow the established conventions for Java documentation (for example, see The Design of Distributed Hyperlinked Programming Documentation (IWHD '95)—A paper on the design of javadoc, the Java Software tool for generating web-based API documentation. Presented at the International Workshop on Hypermedia Design '95), but may also need to take account of the requirements of the data analyser 102, as described later.

The code database 200 may comprise one or more data files 201 containing predefined function definitions, libraries 203 of predefined function definitions and/or links 205a to remote stores 112 where predefined function definitions 205b are located. In the present embodiment, the predefined function definitions are written in Java, but the database may be populated with definitions and descriptions for functions written in any programming language.

The data analyser 102 identifies the functional capabilities of the predefined functions by analysing the semantic content of the function descriptions. As shown in FIG. 3b, function descriptions may conveniently be written as comments 311 in the Java source code. For example, a well known feature of the Java programming language is that information included between the "/** . . . */" symbols are comments. When these comments are provided as a precursor to a method or class declaration in the Java source, they may be put together with a function definition 310 and translated into a documentation file by running a special program called "javadoc". Javadoc is the tool from Sun Microsystems for generating API documentation in HTML format from doc comments in source code (further information is available from the Hypermedia paper referenced above).

For example:

---

COMMENT 311:
/**
* Causes a phone to forward an incoming call to a nominated person.
* This function requires the extension number that you want to forward your calls to
*/
FUNCTION DEFINITION 310:
public void forwardCall (String phone_number){
....
...}

--- is compiled by javadoc into:

Documentation File forwardCall(String)

Causes a phone to forward an incoming call to a nominated person.

Thus the function description 313 for this function forwardCall is "Causes a phone to forward an incoming call to a nominated person". The function description 313 also details input parameters that are required for the function to operate; it is convenient to split the function description into a utility description 315 "A function which causes a phone to forward an incoming call to X", and an input parameter 317 "nominated person". It is understood that splitting the function description, as presented in FIG. 3b, into utility description and input parameter is inessential to the invention.

Figure 3A:
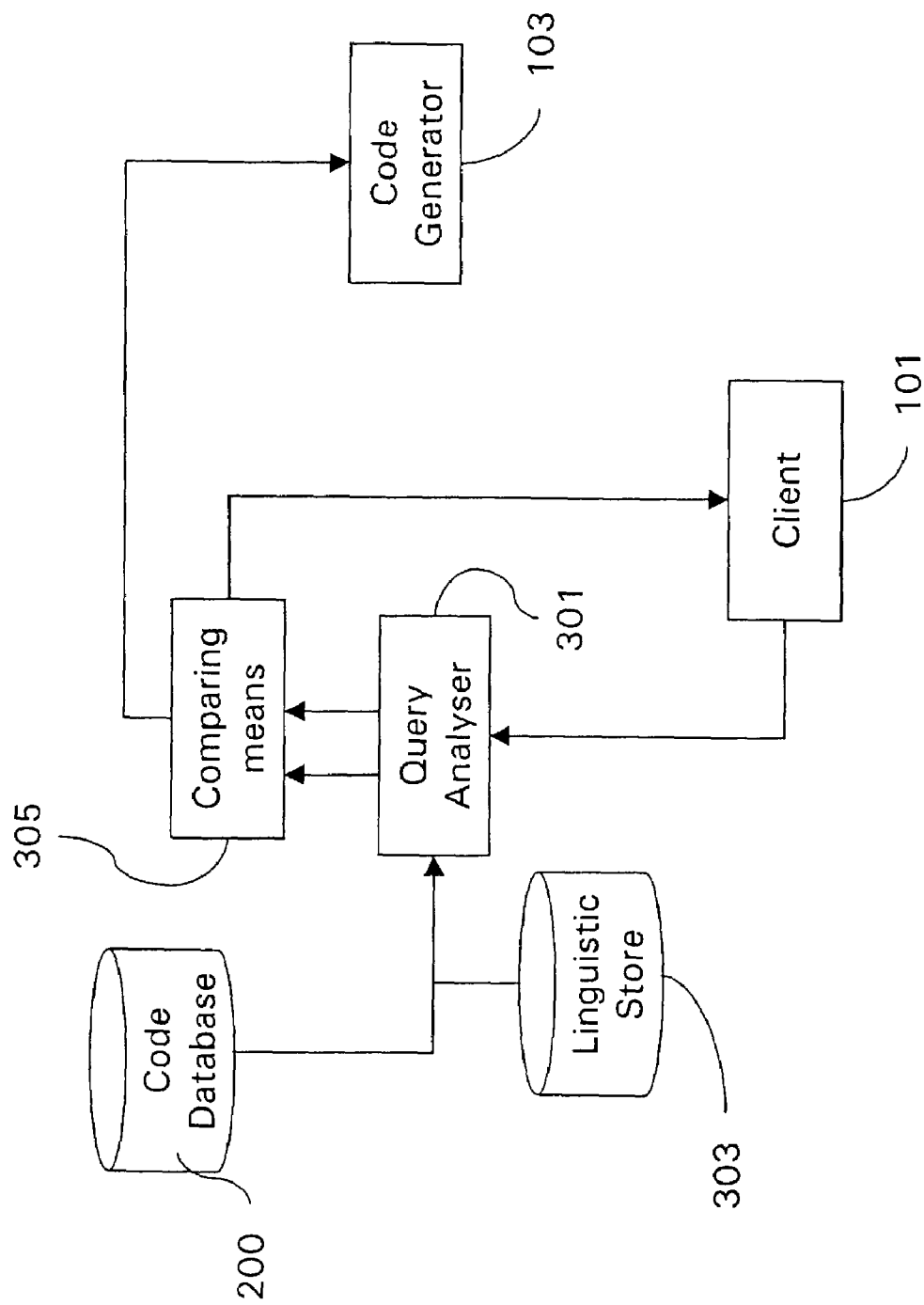
FIG. 3a is a schematic diagram showing analysing means providing part of the apparatus of the embodiments of either FIG. 1a or FIG. 1b.
Figure 3B:
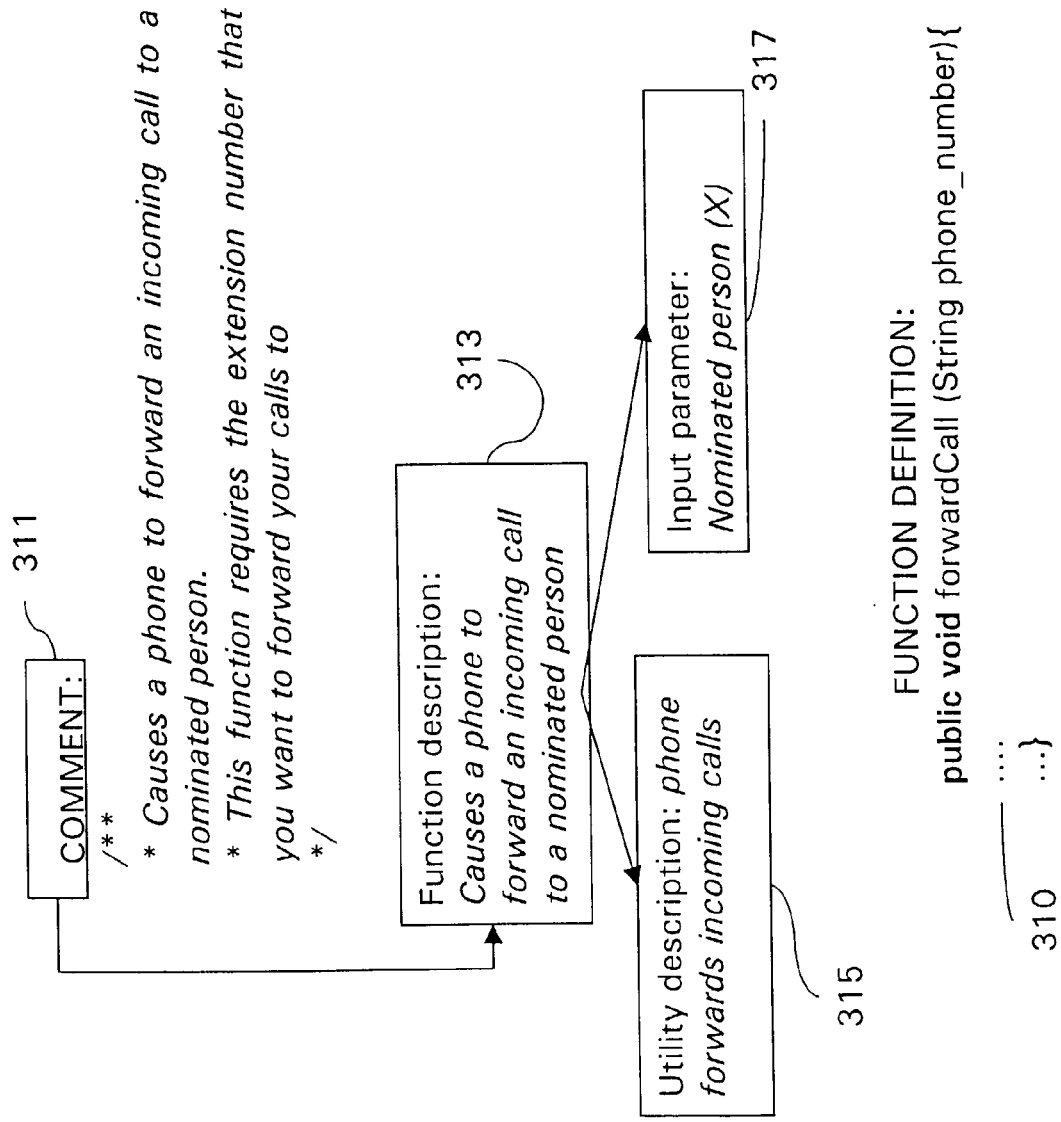
FIG. 3b is a schematic diagram showing the relationship between a functional definition located in the data storage of FIG. 2 and its functional capability.
Figure 4:
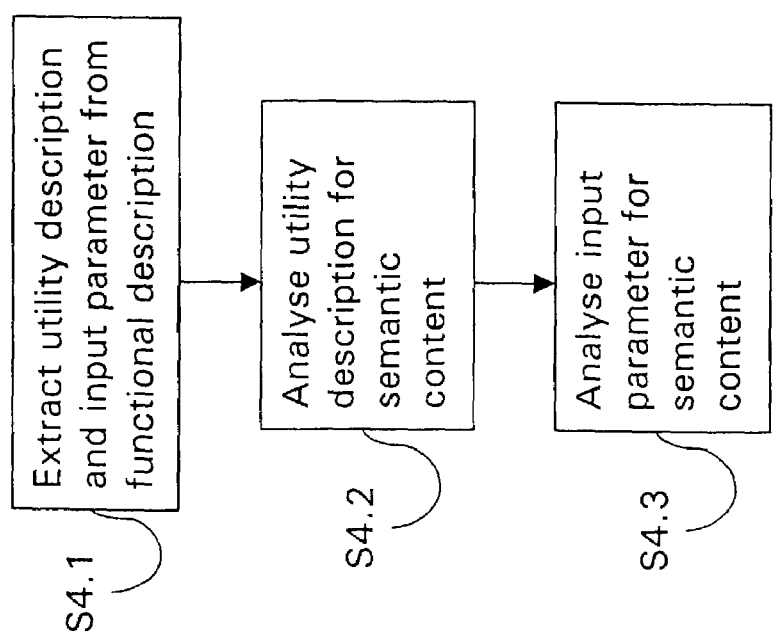
FIG. 4 is a schematic block diagram showing the steps involved in analysing a function description for its semantic content.
Figure 6B:
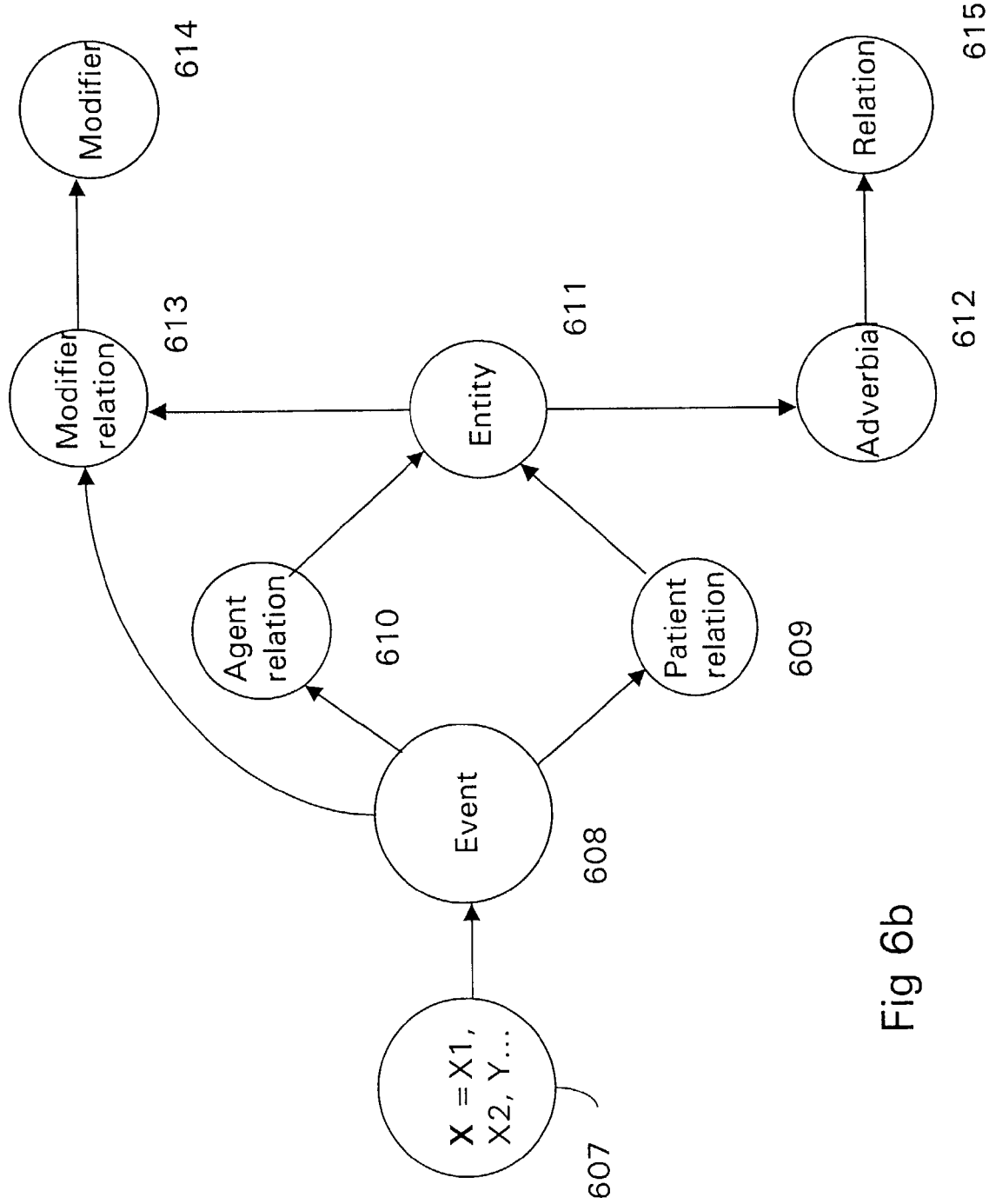
FIG. 6b is a schematic diagram showing analysis of semantic content of phrases.

FIG. 3a shows the analysing means comprising a query analyser 301 which has access to a linguistic store 303 located in the data storage 106. The linguistic store 303 is used to find synonyms, along with semantically equivalent forms of the various types of inputs received by the query analyser 301, and contains representations of pragmatic knowledge needed by the semantics module (for example that "dial Mary" is a shorthand form, which should be treated more fully as "dial Mary's telephone number"). The steps involved in analysing the function description for its semantic content are shown in FIG. 4:

S4.1 Query analyser 301 analyses the function description 313 in order to extract a utility description 315 (A function which causes a phone to forward an incoming call to a nominated person) and an input parameter description 317 (String) (described above with reference to FIG. 3b);

S4.2 Query analyser 301 analyses the utility description 315 for its semantic content. As is known in the art, natural language parsers perform semantic analysis, and the general operation of such parsers is well known. The specific parser utilised in the present invention analyses the utility description 315 in the following manner:

The utility description 315 is broken up into characters;
Any white spaces are found and these are used to determine locations of the word boundaries;
The characters are then put back together to form the respective words;
The words are then all converted to lower case;
This is then stored as a list;
The list is analysed to determine what sort of sentence it is (declarative, imperative, Yes/No question, which question, If/then condition etc.) (FIG. 6a, described below);
Each word on the list is analysed for its semantics and its relationship with the rest of the words, and this generates a list of semantics (FIG. 6b, described below).

Furthermore, the base form of the operative verb, which for the above example is "forward", is analysed for synonyms, along with semantically equivalent forms using derivational morphology in a linguistic store 303, giving a list of properties such as send, deliver, give etc. The other properties of the subject, which is the telephone, are extracted in a similar way, such that "incoming call(s)" and "nominated person" are assigned semantic meanings and alternatives;

S4.3 Query analyser 301 analyses the input parameter description 317 in order to understand the number, and type, of parameters, or arguments, required by the function (following identical procedure to that described above with reference to S4.2).

In the present embodiment, the query analyser 301 generates Prolog facts to represent the semantically meaningful elements generated at steps S4.2 and S4.3, and these facts are stored locally, for example in a temporary database or in memory. The semantics of the function are stored in the form:

method(forward_Call,sem([forward(__1,forward:v:_),
   r(__2,patient,__1,__3), e(__3,call:n:_)]),param
   (["the extension number that you want to for-
   ward calls to])),                        (Expr. 1)

which means that the function name, function semantics and arguments required by the function are stored.

The Prolog mechanisms involved are explained in introductory textbooks on the language, for example Clocksin and Mellish, "Programming in Prolog", Springer-Verlag, 1987.

Some of the function descriptions may have been pre-processed for their semantic meaning by the query analyser 301, or may be processed concurrent with submission of an input statement by the client 101. In the latter case the user may be required to specify the class, or classes, in which coded functions corresponding to potential input statements are located, and the results from the analysis would be written to a temporary file for subsequent access. For the purposes of the present description, where the predefined methods are written in Java, it is assumed that the method descriptions are analysed for their semantic content in parallel with analysis of input statements.

Analysis of an Input Statement

When the generator 100 is loaded on the server computer 105, input statements, which are entered in natural language, are submitted to the generator via a browser 104. The statements may comprise condition/action information or factual information, such as:

Condition/Action:
  (i) "If I am in a meeting and the caller is from outside BT, then you should take a message", or
  (ii) "Calls should be forwarded If I am in a meeting and the call is urgent"

Factual:
  (i) "My mobile phone number is 07970 111111"
  (ii) "I am in a meeting from 1 pm to 3 pm"

Thus the input statement may be considered to have certain functional requirements—for the Condition/Action example (i) above, the requirement is that: "a message should be taken given the conditions that I am in a meeting and the caller is from outside BT". As described above, this functional requirement is a semantic representation of the input statement and is extracted by analysing means forming part of the data analyser 102, as described below.

Figure 5:
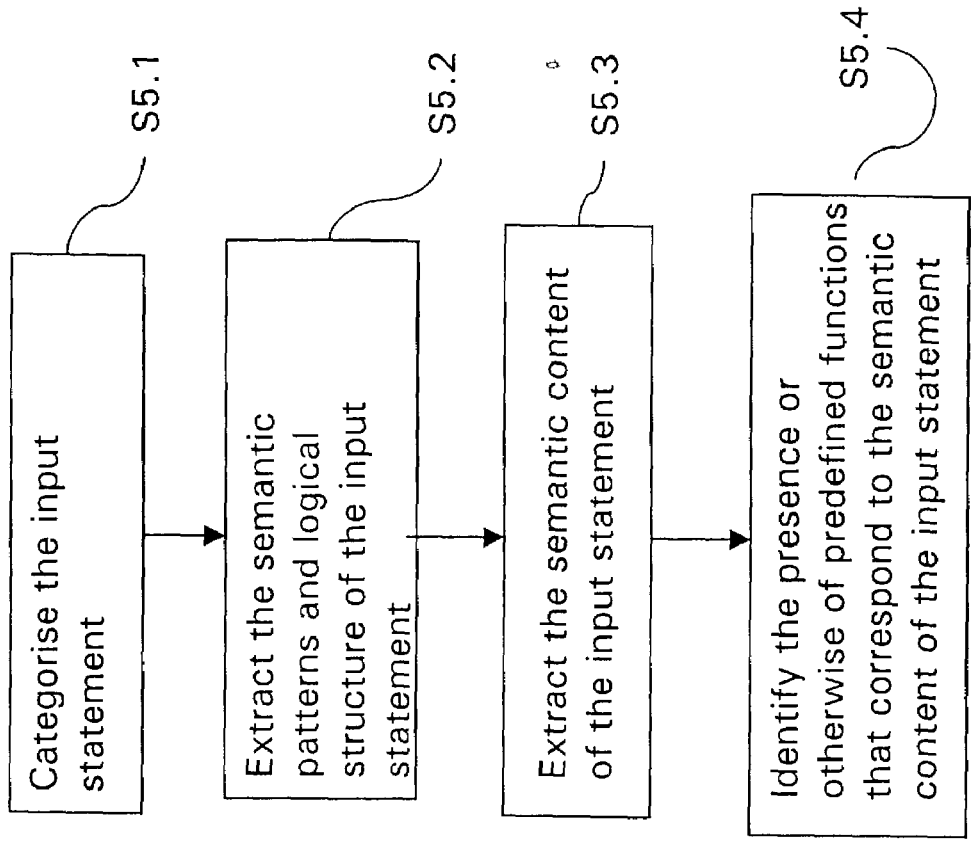
FIG. 5 is a schematic block diagram showing the steps involved in analysing an input statement for its semantic patterns, logical structure, semantic content and for matching semantic content between the function descriptions and the input statement.

The input statement is firstly pre-processed to remove white spaces etc as described above in S4.2, and is then categorised into a type of input statement. The category identifies both the semantic patterns comprising the input statement and the logical structure of the input statement. FIGS. 6 shows a semantic tree diagram having a plurality of types of input statements, predetermined paths as a function of the type of input statement and semantic patterns in those paths. The semantic patterns may specify actions, conditions, and statements, each of which require identifying if the input statement is to be coded by the code generator 103. Then the semantic content of the input statement is analysed by the query analyser 301, and instantiated against the function descriptions previously generated at step S4.2 in order to identify function descriptions (thus processable events) that fulfil the input statement functional requirements. With reference to FIG. 5, this procedure can be identified as having the following distinct parts (information relating to each point is expanded below):

S5.1 Categorise the input statement into declarative, imperative, conditional, Yes/No question, who/what/where/when question etc.

S5.2 Extract the semantic patterns and logical structure of the input statement.

S5.3 Extract the semantic content of the input statement.

S5.4 Identify the presence or otherwise of predefined functions that correspond to the semantic content of the input statement.

S5.1 Categorise the Input Statement into Declarative, Imperative, Conditional, Yes/No Question, Who/What/Where/When Question etc:

As the type of input statement governs the semantic patterns and logical structure of the input statement, as shown in FIG. 6*a*, once the type of input statement has been derived, the query analyser 301 is able to search for a well defined set of semantic patterns. It is crucial for the system to be able to identify semantic patterns, as this is used to identify the occurrence of logic statements and/or factual statements, conditions, actions etc. that will be translated into source code by the code generator 103.

S5.2 Extract the Semantic Patterns and Logical Structure of the Input Statement:

Depending on the type of input statement identified at S5.1, the input statement is analysed for specific semantic patterns. As shown in FIG. 6*a*, the query analyser 301 branches into a semantic path, once the type of input statement has been identified, analysing the input statement for the semantic patterns listed therein.

The above input statement example: "If I am in a meeting and the call is urgent, forward the call to my mobile" is categorised as a declarative type of input statement. Following the corresponding branch 601 in FIG. 6*a*, the query analyser 301 searches for an instance of logical structure IF(X, Y) 603, which represents (if (condition: X 605) then (action: Y 607)).

For this example, the semantic pattern that indicates the IF(X, Y) 603 structure is r(1000,sconj(if),1001,1002), where sconj represents 2 phrases joined by a conjunction. The query analyser 301 identifies the presence or otherwise of this in the input statement by searching for a sconj expression. In the present example, the query analyser 301 will also detect "and", which indicates a second condition, AND(X1, X2) where X2 is the second condition: r(1007,sconj(and), 1002,1008). Clearly the semantic patterns that are used to extract the semantic content at S4.2 may vary between parsers, and this example is merely illustrative of the general technique. Thus the present example input statement is analysed as having the following structure:

Sentence (declarative)→If I am in an important meeting and the call is urgent, p1 you should forward the telephone call to my mobile
  if(X,Y)→If (I am in an important meeting and the telephone call is urgent, you should forward the telephone call to my mobile)
    X→I am in an important meeting and the telephone call is urgent
    and(X1,X2)→And(I am in an important meeting, the telephone call is urgent)

| | |
|---|---|
| X1 → I am in an important meeting | → Condition 1 |
| X2 → the telephone call is urgent | → Condition 2 |
| Y → you should forward the telephone call to my mobile | → Action |

S5.3 Extract the Semantic Content of the Input Statement:

The parts of the input statement that correspond to X1, X2, and Y are passed, in turn, for analysis of their semantic content, as shown in FIG. 6*b*:

```
X1 → I am in an important meeting        → Condition 1
    Event 608 → Be
        Agent relation 610 → ✓
            Entity 611 → I
        Patient relation 609 → in
            Entity 611 → meeting
                Modifier relation 613 → value
                    Modifier 614 → important
X2 → the telephone call is urgent        → Condition 2
    Event 608 → be
        Agent relation 610 → ✓
            Entity 611 → call
                Modifier relation 613 → attribute
                    Modifier 614 → urgent
Y → you should forward the telephone call to    → Action
my mobile
    Event 608 → forward
        Agent relation 610 → ✓
            Entity 611 → you
        Patient relation 609 → ✓
            Entity 611 → call
                Adverbial 612 → ✓
                    Relation 615 → to
                        Entity 611 → my mobile
```

When analysing the semantic content of either the function description or the input statement, the respective semantic analyses may identify one or more ambiguities in the input statement. If this occurs with the input statement, the query analyser 301 sends a message to the client 101, asking the user to resolve between possible semantic representations. Furthermore, the query analyser 301 may find that more than one function description meets the functional requirement of the input statement; in this situation, the analyser 301 sends a message to the client 101 asking the user to select one of the function descriptions. It should be noted that this may also occur with the function descriptions, in which case the description would have been amended by the software developer at an earlier stage.

Subsequent Combining of These Analyses:

S5.4 Identify Predefined Functions Corresponding to the Semantic Content of the Input Statement:

S5.4.1

The comparing means 305 compares the uninstantiated semantic content of the input statement with the semantic content of the predefined function descriptions (re-cap: these identify one or more processable functions) until the input statement semantics match the function description semantic content. For the above example, where the input statement includes the action, Y, "forward a call to my mobile", the semantics for this are:

event(22,forward:v:_),r(33,patient,22,44),e(44,call:n:
_)

The comparing means 305 will search for method(Method,sem(event(22,forward:v:_),r(33,pa-
    tient,22,44), e(44,message:n:_)),param(Param))    (Expr. 2)

and Method will be instantiated to forward_Call from Expr. 1. In this way, the comparing means 305 establishes the presence or otherwise, of a function that is capable of performing the functional requirements of the input statement. (This example illustrates instantiation of an action, but in practice, the input statement also may comprise factual statements and a combination of actions and factual statements).

S5.4.2

Any input parameters, or arguments, that are required are instantiated: If there are input parameters to be instantiated, the facts corresponding to the input parameter in Expr. 1, [ ],are assigned to Param in Expr. 2. In some cases, the analysis will not identify a value for Param in Expr 2, in which case the comparing means 305 has two courses of action:

(i) Find and assign a default value to Param: some of the function descriptions include default parameters that may be used as input parameters in the absence of an input parameter; if this is the case, the comparing means 305 assigns the default to the input parameter. Alternatively an initialisation class or function, which contains default values, may be specified, and the respective values read in by the comparing means 305

(ii) If there is no default parameter among the function description, the comparing means 305 sends a message to the client 101, prompting the user to supply an input parameter.

Once the semantic content of the input statement has been instantiated, the identified functions and logical structure are submitted to the code generator 103, which, for the example above, inserts source code corresponding to X1, X2 and Y into a template. The code generator 103 runs a process that reads in the logic statements, extracts the relationship between them, in the form IF X1 && X2 THEN Y, and inserts the identified functions and statements into a Java template at predetermined locations.

This process includes analysing the corresponding semantics to form variables specific to the conditions. Thus for condition X, "I am in a meeting", the semantics for the parser utilised in the present embodiment are:

card(1004,sing),ref(1004,1,sing,_11368),event(1002,
    be:v:_11379),aspect(1002,active&
    _11389&pres&non_perf&non_prog),r(1003,
    ptoken,1002,1004),r(1005,pp(in),1002,1006),def
    (1006,indef),card(1006,sing) ,e(1006,meeting:
    n:_11433)

This enables derivation of:
the event which governs the condition: event(1002,be:v:
    _11379)—be;
the relation between the event and the entity: (r(1005,pp
    (in),1002,1006))—pp(in);
the entity associated with the event: e(1006,meeting:n:_**1
    1433**)—meeting.

These are then concatenated to form a condition variable event_relation_entity, which for this example creates variable "be_in_meeting", and this is inserted into the template at predetermined locations, as illustrated below.

```
import java.util.*;
import java.lang.*;
public class PolicyClass {
protected Actions action = new Actions( );
protected Boolean call__be__urgent = false;
protected Boolean be__in__meeting = false;
/*bold font indicates insertion of input statement-specific code*/
public PolicyClass ( ){
}
public void runPolicy( ){
if ((be__in__meeting = = TRUE) && (call__be__urgent = = TRUE)){
    action.forward_call (0770 111 111);
    }
  }
}
```

Thus, Boolean variables for conditions X1, X2, (call_be_urgent, be_in_meeting) are declared in the declaration section, and IF X1 && X2 THEN Y is coded into the executable part of the code. In this example, the function forward_call is defined in class Actions, which, together with its function description, is stored in the code database 200. An instance, action, of the class Actions that contains function forward_call is created in the class definition. The latter contains information such as mobile phone number etc., and is accessed for assigning the input parameter to action Y.

The setting of flags call_be_urgent, be_in_meeting occurs either by explicitly providing conditions as input statements, e.g. "I am in a meeting from 1 pm to 3 pm" (re-calling that from . . . to are analysed as logical operators), or by linking the generator 100 to an electronic diary system, such as Mircrosoft™ Outlook".

Other input statements that are subsequently entered, and which require use of functions within the same class Actions (i.e. same part of the code database 200), may be analysed and added to this code. The code that is generated for this embodiment—processing of phone calls—is run each time a phone call is received, and the generator 100 runs through each of the conditions in order to retrieve a corresponding function. If an input statement, which relates to a different class (so different subject matter etc.), were entered, a new instance would be created from a fresh template.

Second Embodiment

Figure 7:
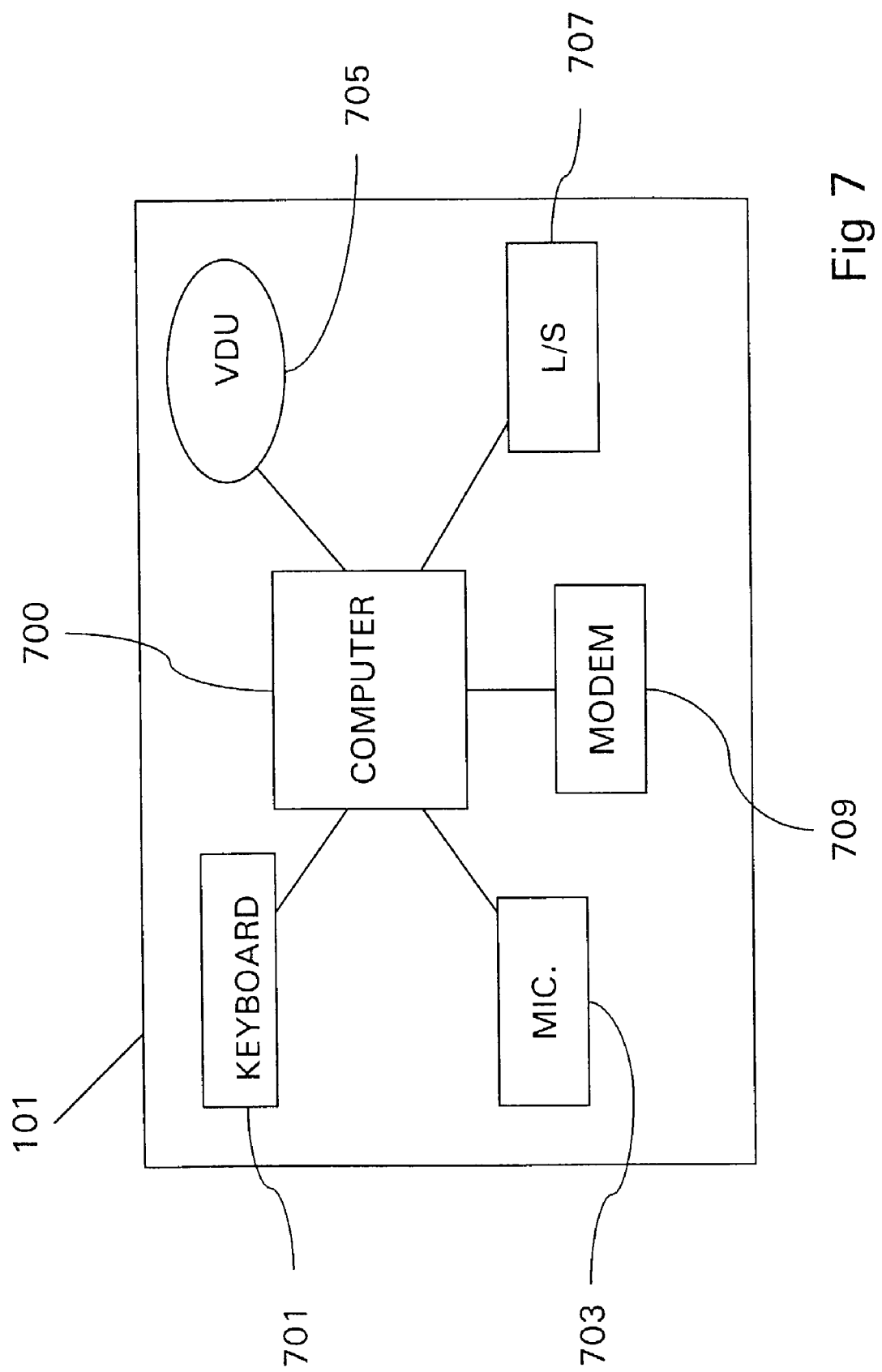
FIG. 7 is a block diagram showing a terminal utilised in a second embodiment of the invention and corresponding to that shown in FIG. 1.

Input of Data:

In earlier embodiments, the data entries are typed into the terminal 101 as text via the keyboard 701 shown in FIG. 7. In the present embodiment the terminal 101 is provided with a microphone 703, and the input text is dictated and transliterated by a speech-to-text conversion program, such as ViaVoice™ available from IBM Inc.

The input speech is reproduced as text in a text input area of the screen 705, and in other respects the present embodiment operates as described above.

It is advantageous to provide the speech recognition at the terminal 101, where it is possible to train on the voice of the individual user, rather than centrally. Also, since text rather than audio is uplinked, the required uplink bandwidth is kept low. Furthermore, speech recognition requires significant computer processing and it is advantageous if this is provided on individual users' machines rather than on a central server. On the other hand, providing the generation centrally avoids the need to store multiple rules databases locally at terminals.

In this embodiment, the terminal 101 may also comprise a text to speech program arranged to synthesise speech from the text received from the computer 700 to provide audio output via a loudspeaker 707.

If an applet is running on a browser installed on the client terminal 101 (see below), the applet may also be arranged to generate a visual display to represent the output data. For example, a representation of a human face, or an entire human head, animated in synchronism with the output speech as described in our earlier application EP-A-225729, or a sign language display comprising an animated representation of a pair of hands generating sign language (for example British or American sign language) from a text to sign language converter program. This latter embodiment is particularly advantageous for those with hearing difficulties.

Third Embodiment

Multilingual Input Statements:

In the above-described embodiments, the description assumes that the input statements are presented in the English language. However, the form of the input statement results in a representation that is substantially language-independent. The present embodiment utilises this to handle input statements in multiple languages by providing a means for storing semantics in multiple languages, together with a means for linking similar semantics across languages.

Figure 8:
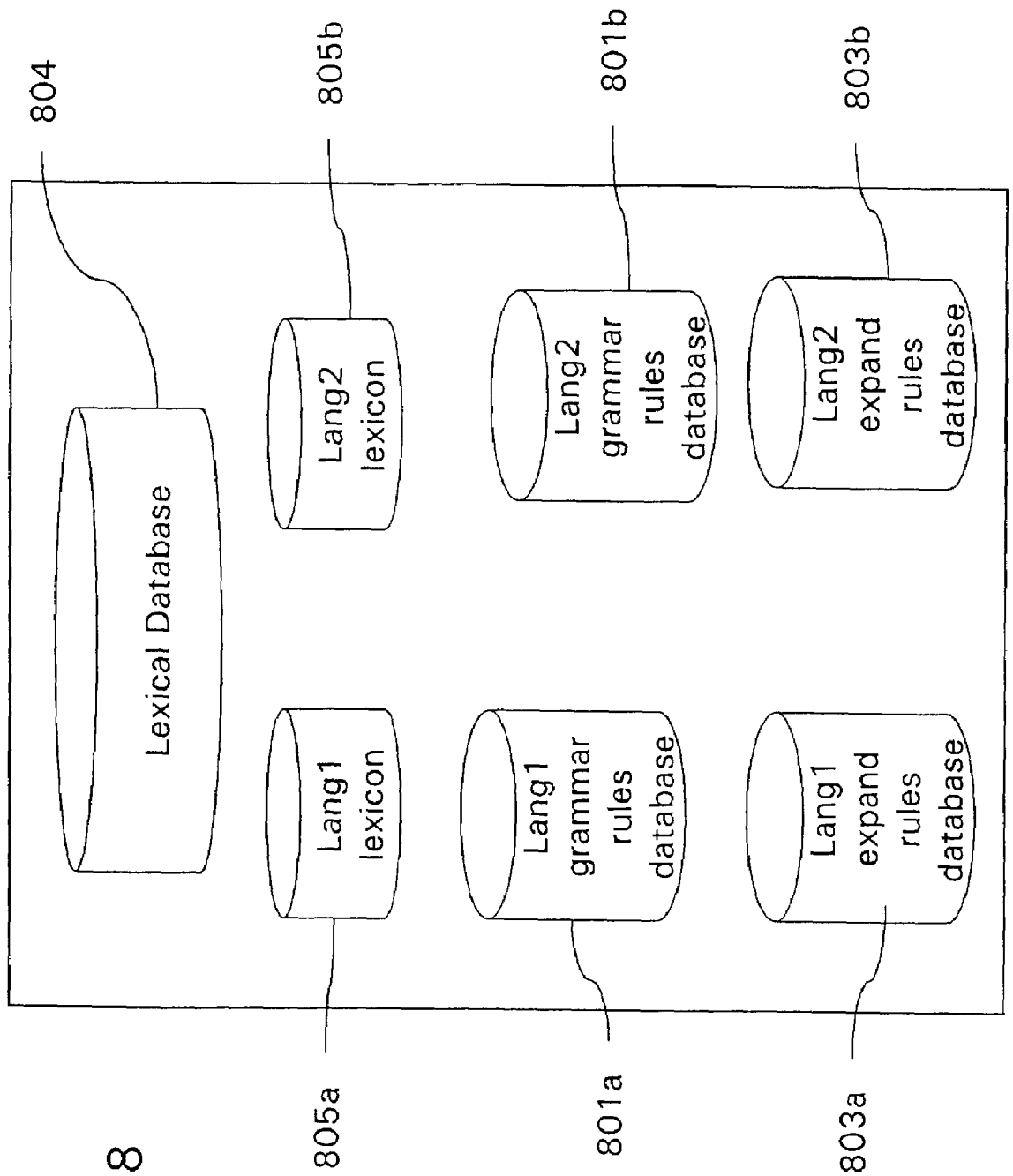
FIG. 8 is a block diagram showing an arrangement of lexical components according to a third embodiment.

Briefly, referring to FIG. 8, the data storage 106 includes a plurality of grammar rules databases 801a, 801b, . . . and corresponding expansion databases 803a, 803b, . . . Each pair of databases 801, 803 relate to a given language. On submission of the input statement, the user specifies the language of the text (the source language), and the application from which the input statement is entered (see below) accesses the appropriate expansion and grammar rules databases to analyse the text.

The lexical database 804 in this embodiment comprises a plurality of language-specific lexicons 805a, 805b, . . . , each containing a word list for the language concerned, with each word of the list including a pointer to one or more entries in the lexical database 804, which stores entries comprising meaning data for meanings of each word, and a pointer back to each word for which the entry is a meaning.

Many words in different languages are directly translatable (in the sense of sharing a common meaning), such that many meaning entries in the lexical database 804 store pointers to words in each language. Not all words are directly translatable, and where meanings differ, the lexical database 804 includes additional, language-specific definitions with pointers from words in only those languages in which they occur.

The above description assumes that the input statements are entered manually. It may also be advantageous to have input statements translated either automatically or semiautomatically. Our earlier application number PCT 97186887.6, filed on 8 Aug. 1997 (and corresponding PCT application PCT/GB98/02389 filed on 7 Aug. 1998), discloses a method of language translation that is particularly suitable for this purpose.

Implementation

Figure 9:
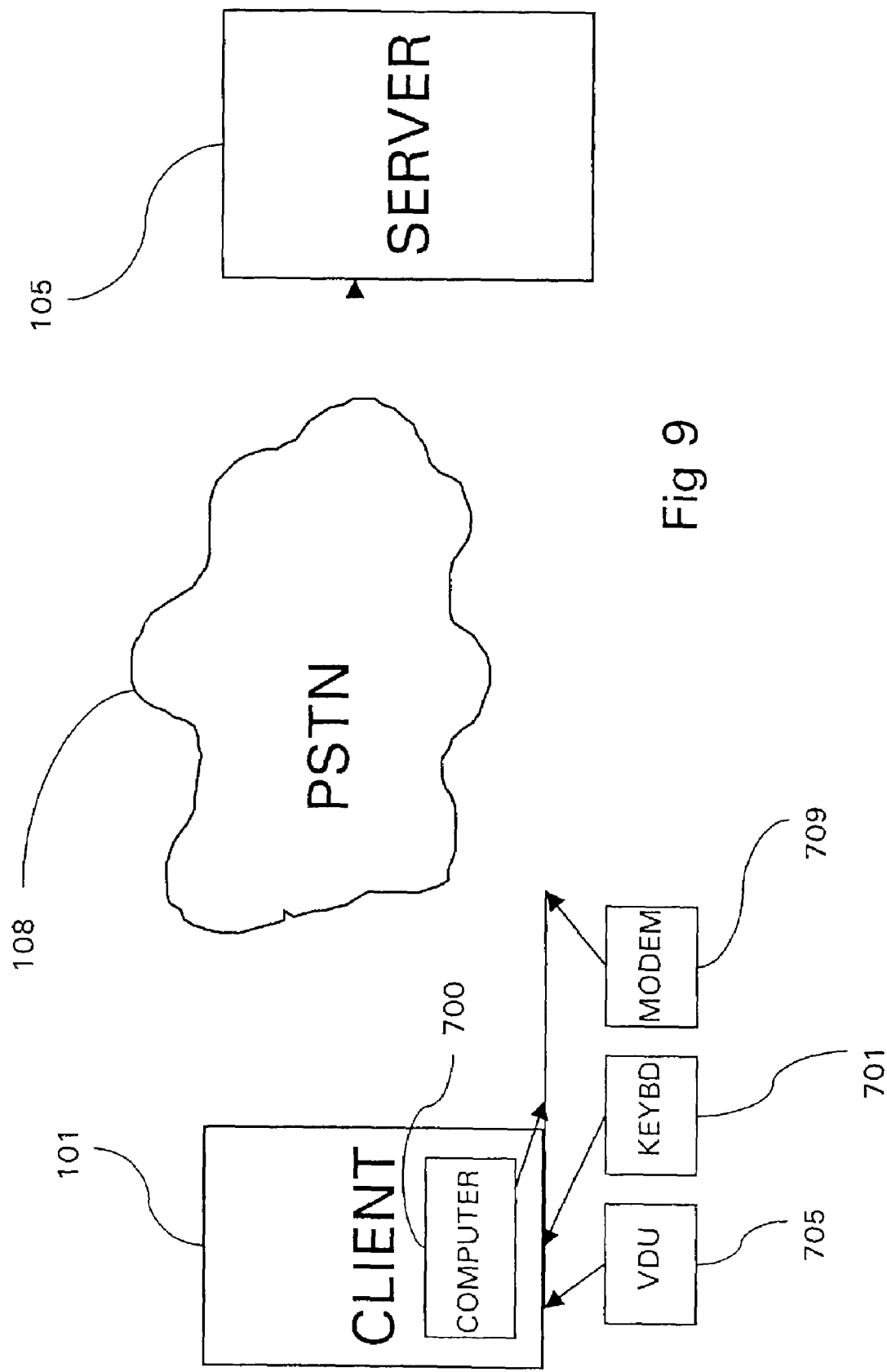
FIG. 9 is a block diagram showing in greater detail the components comprising the client terminal shown in FIGS. 1a and 1b.

With reference to FIG. 9 of the accompanying drawings, and as described above in the context of the second embodiment, the client computer 101 comprises a keyboard 701, a VDU 7051, a modem 709, and a computer 700 comprising a processor, mass storage such as a hard disk drive, and working storage, such as RAM. For example, a SUN™ work station or a Pentium™ based personal computer may be employed as the client terminal 101. When the generator is loaded on a standalone computer, such as is shown in FIG. 1a, the computer 700 is computer 105.

Figure 10:
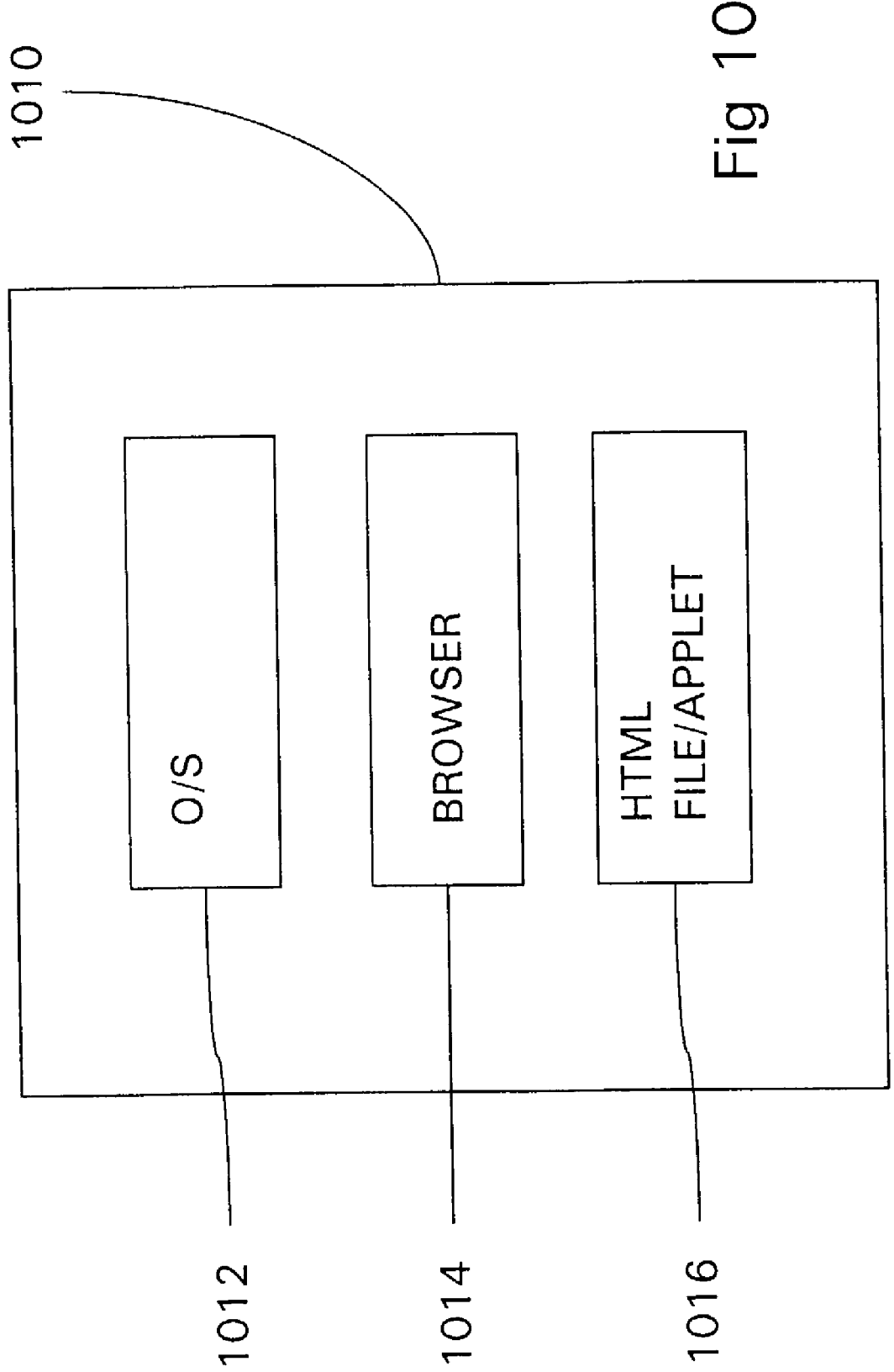
FIG. 10 is a block diagram showing in greater detail the processes present in the client terminal shown in FIGS. 1a and 1b.

Referring to FIG. 10, an operating control program 1010 comprising:

(i) an operating system 1012 (such as Windows™);
(ii) a browser 1014 (such as Internet Explorer™); and
(iii) an application 1016 (such as a Java™ applet, or a plain HTML file), which is designed to operate within the browser 1014, is stored within the client terminal 101 (e.g. on the hard disk drive thereof), when the generator is loaded on a networked computer, as is shown in FIG. 1b. The function of the operating system 1012 is conventional and will not be described further. The function of the browser 1014 is to interact, in known fashion, with hypertext information received from the server 105 via the PSTN 108 and modem 709. The browser 1014 thereby downloads the applet, or plain HTML file 1016, at the beginning of the communications session, as part of a hypertext document from the server 105. The function of the HTML file 1016 is to allow the input of information for uploading to the server 105 by the user, through the browser 1014. When the computer 105 is a standalone computer, a suitable GUI software application may be used to interface with the generator instead of a browser 1014 and html file 1016.

Figure 11:
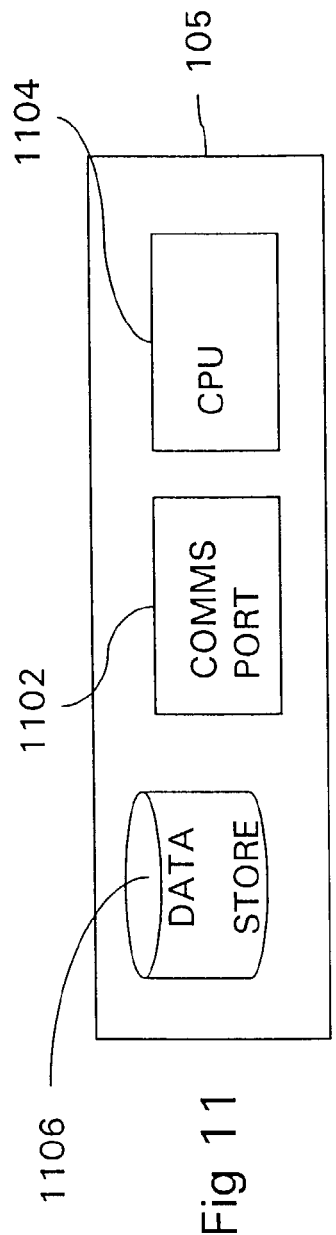
FIG. 11 is a block diagram showing in greater detail the components comprising the server shown in FIGS. 1a and 1b.

When the generator 100 is run on a networked computer, then the server 105, referring to FIG. 11, comprises a communications port 1102 (e.g. a modem); a central processing unit 1104 (e.g. a mainframe computer) and a mass storage device 1106 (e.g. a hard disk drive or an array of disk drives). The server 105 comprises an operating program comprising an operating system such as Unix™, a server program and an application program (not shown). The operating system is conventional and will not be described further. The function of the server program is to receive requests for hypertext documents from the client terminal 101 and to supply hypertext documents in reply. Specifically, the server program initially downloads a document 1016, possibly containing the applet, to the client terminal 101. The server program is also arranged to supply data to, and receive data from, the application program, via, for example, a cgi.bin mechanism or Java Remote Method Invocation (RMI) mechanism. The application program receives data (via the server program) from a client terminal 101, performs processing, and may return data (via the server program) to that client terminal for display.

In the present embodiment, the user specifies, via the HTML file 1016, which Java class should be accessed from the data storage 106. However, as described above, this is inessential to the invention, as the generator 100 could analyse all of the data contained within the store 106. Typically, the user specifies a class, or classes, when the user knows which class, or classes, provides the functional requirements of the input statements. (When the language function to be accessed is written in a non object-oriented language, the user may specify the file containing the function(s) as required).

Once the class has been selected, it is compiled, creating a further HTML file (not shown). This further HTML file includes a list of function descriptions corresponding to class member functions that are input to the data analyser 102 for analysis as described in steps S4.1 to S4.3 above.

As an alternative source of function descriptions, and in situations where a predefined function is not accompanied by a natural language description in the data storage 106, the generator 100 could additionally comprise means for extracting a description of the functionality of a function. For example, using code translating means, such as is commonly used to translate between the C and Fortran programming languages, the functionality associated therewith may be extracted, for instance, into a language-independent form. If the query analyser 301 were to interface with such a means, together with a data store comprising descriptions of language-dependent functions, then the functionality could be translated into natural language and be analysed for its functional capability as described in the above embodiments.

The embodiments of the present invention concern natural language inputs, where input statements are syntactically and semantically analysed using a parser. The term natural language is generally understood to mean a system for communicating which uses symbols (that is, characters) to build words. The entire set of words is the language's vocabulary, and the ways in which the words can be meaningfully combined is defined by the language's syntax and grammar. The actual meaning of words and combinations of words is defined by the language's semantics. In the limit, this syntax and grammar can be extremely simple, (for example comprising action commands such as "divert call") and the present invention is operable to accept such sparse input statements provided a suitable parser is selected for the query analyser 301.

Figure 12:
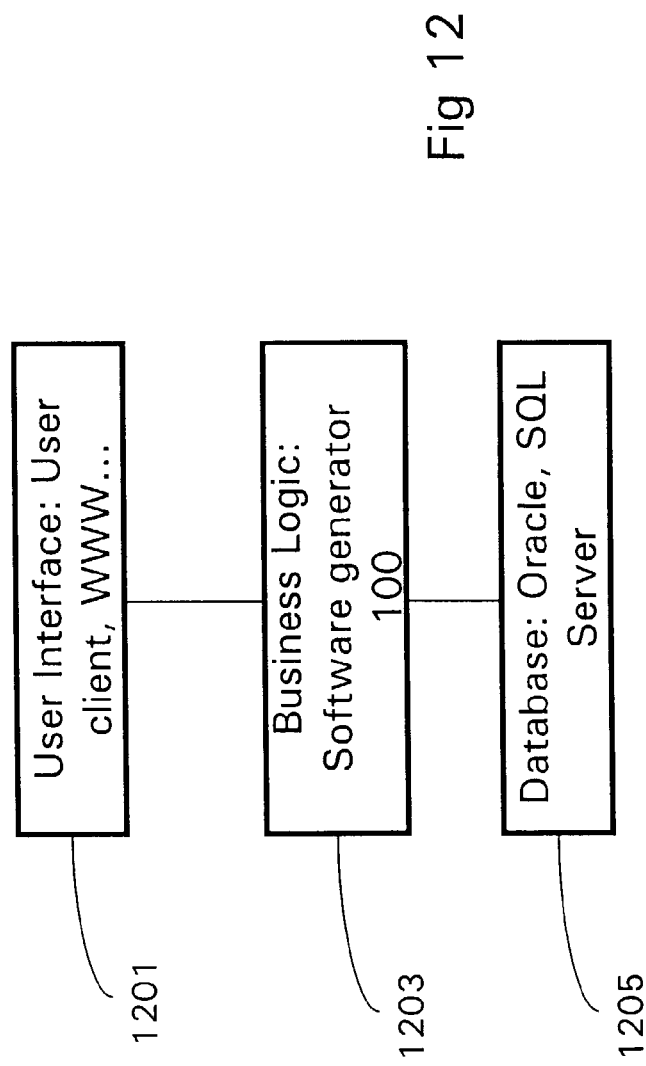
FIG. 12 is a block diagram showing a possible implementation configuration for software automatically generated using the apparatus shown in FIGS. 1a and 1b.

Once the generator 100 has produced a working code, the working code can be run in a variety of configurations. As stated previously, many parts of a software system tend to overlap with other systems and many software systems adopt a "three-tier" architecture, as shown in FIG. 12. The user interface tier 1201 and the data storage tier 1205 tend to be very similar for many applications, with the middle tier 1203 implementing the business logic which determines what the system does. The techniques described above can be used to generate code to implement the middle tier 1203, thus making the invention applicable to a wide range of software systems.

The working code can also be run on network devices such as routers, in order to provide a software tool for effecting changes to local network behaviour. For example, routing tables and/or route algorithm parameters may be changed in this way. In such a case the generator 100 may be located on a server computer (alternatively the middle tier 1203 if the system architecture is a three-tier architecture), and configured to operate such that the working code output therefrom is transmitted to network devices at a predetermined time. The input statement to, and running of, the generator 100, may be invoked by a system script, written, for example, in the Perl programming language, and the whole process may therefore be automated by system timers.

The working code may also effect building of reactive software agents, which are essentially computer programs, according to a natural language specification.

In a preferred embodiment, the invention is used for control of terminal devices used in a communications system, of which the telephone has been discussed above as an example. A more complete (though non limiting) list would include: telephones, video cameras, 3D displays, personal digital assistants, cellular telephones, satellite telephones, pagers, video phones, facsimiles, payphones, quertyphones, personal computers, lap top portable computers, engineering workstations, audio microphones, video conference suites, telemetry equipment.

In addition to these communications terminal devices, and provided there is access to the required function definitions, the generator 100 can be similarly implemented in a range of household devices, such as lighting devices, washing machine, television, video etc. where the selection of control parameters is currently effected manually. Manufacturers of such devices may provide a library, or equivalent, of function definitions from which a user can select a desired functionality. These functions would then be loaded into the data storage 106 for use according to the invention.

The generator 100 generates code. That code will be compiled into object code when run on a particular platform and the same code may therefore produce different behaviour in different systems.

Many modifications and variations fall within the scope of the invention, which is intended to cover all permutations and combinations of the generator described herein.

As will be understood by those skilled in the art, the invention described above may be embodied in one or more computer programs. These programs can be contained on various transmission and/or storage mediums such as a floppy disc, CD-ROM, or magnetic tape so that the programs can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of automatically generating software from one or more predefined functions in accordance with an input statement entered in natural language, the method comprising:
   (i) analyzing an input statement for semantic content to extract first semantically meaningful elements using an analysis algorithm;
   (ii) analyzing one or more predefined functions for semantic content to extract one or more sets of second semantically meaningful elements using the same analysis algorithm as in step (i);
   (iii) identifying at least one of a condition, an action and/or a statement in the input statement;
   (iv) comparing the first semantically meaningful elements with the second semantically meaningful elements to identify one or more predefined functions that correspond to one or more action and/or statement of the input statement;
   (v) combining at least some of the first semantic elements in accordance with any conditions identified at step (iii) to generate corresponding condition variables;
   (vi) combining functions and condition variables identified at steps (iv) and (v) according to a set of predetermined rules to generate software.

2. A method as in claim 1, in which comparing step (iv) includes:
   a) inputting a set of second semantically meaningful elements into a predetermined rule;
   b) inputting the first semantically meaningful elements into the rule;
   c) processing the rule;
   d) evaluating the result of step (c); and
   e) repeating steps (a) to (c) for different sets of second semantically meaningful elements until as solution is evaluated at step (d).

3. A method as in claim 1, in which step (v) includes for each condition identified at step (iii):
   a) identifying an event governing the condition;
   b) identifying an entity associated with the event;
   c) identifying a relation between the event and the entity; and
   d) concatenating the event, the entity and the relation therebetween, thereby forming a condition variable.

4. A method as in claim 1, in which the functions and condition variables identified at steps (iv) and (v) are inserted respectively into a predetermined code template.

5. Computer apparatus for automatically generating software from one or more predefined functions in accordance with an input statement entered in natural language, the apparatus comprising:
   (i) extracting means for extracting first semantically meaningful elements from the input statement and for extracting one or more sets of second semantically meaningful elements from the one or more predefined functions using a common extraction algorithm for both said extraction processes;
   (ii) identifying means for identifying conditions, actions and/or statements in the input statement;
   (iii) comparing means for comparing said first semantically meaningful elements with said second semantically meaningful elements to identify one or more predefined functions that correspond to an action and/or statement in the input statement;
   (iv) first combining means for combining at least some of the first semantic elements in accordance with conditions identified by the identifying means to generate corresponding condition variables;
   (v) second comparing means for combining the condition variables and predefined functions according to a set of predetermined rules to generate software.

6. Computer apparatus as in claim 5, wherein the extracting means is a natural language parser.

7. Computer apparatus as in claim 5, including a predetermined code template.

8. Computer apparatus as in claim 5, wherein the identifying means identifies conditions, actions and statements in accordance with the occurrence of one or more predetermined semantic patterns.

9. Computer apparatus as in claim 5, wherein the software is used in the control of terminal devices in a communications system.

10. Computer apparatus for generating code instructions for controlling equipment to carry out one or more activities, said apparatus comprising:
    a) an input for receiving instructions for use in controlling the equipment;
    b) received instruction processing means for extracting one or more semantically meaningful elements describing operations and extracting one or more semantically meaningful elements describing logical operators from received instructions using a common extraction algorithm for both said extraction processes;
    c) means for storing a plurality of code instructions for controlling the equipment to carry out activities;
    d) means for processing stored code instructions to identify a code instruction relevant to an operation extracted from a received instruction by identifying extracted elements from the input instructions and comparing the extracted elements with each other;
    e) means for translating extracted logical operators into code by identifying extracted elements from the input instructions and comparing the extracted elements with each other; and
    f) code generating means for selecting at least one identified code instruction and combining it with at least one translated logical operator to generate said code instructions for controlling the equipment to carry out the one or more activities.

11. Computer apparatus as in claim 10 wherein said received instructions comprise natural language.

12. Computer apparatus as in claim 11 wherein the received instruction processing means comprises a parser.

13. Computer apparatus as in claim 10 wherein the received instruction processing means also provides the means for processing stored code instructions.

14. A method as in claim 1 wherein said predefined functions are also defined using natural language.

15. Computer apparatus as in claim 5 wherein said predefined functions are also defined using natural language.

* * * * *